US010472033B2

(12) United States Patent
Heinen et al.

(10) Patent No.: US 10,472,033 B2
(45) Date of Patent: Nov. 12, 2019

(54) SYSTEMS AND METHODS FOR POWER GENERATION BASED ON SURFACE AIR-TO-WATER THERMAL DIFFERENCES

(71) Applicant: Raytheon Company, Waltham, MA (US)

(72) Inventors: Gregory W. Heinen, Lowell, MA (US); David J. Geroski, Ann Arbor, MI (US)

(73) Assignee: Raytheon Company, Waltham, MA (US)

( * ) Notice: Subject to any disclaimer, the term of this patent is extended or adjusted under 35 U.S.C. 154(b) by 91 days.

(21) Appl. No.: 15/787,948

(22) Filed: Oct. 19, 2017

(65) Prior Publication Data

US 2018/0118316 A1  May 3, 2018

Related U.S. Application Data

(60) Provisional application No. 62/414,567, filed on Oct. 28, 2016.

(51) Int. Cl.
*F01D 15/10* (2006.01)
*F02C 6/00* (2006.01)
(Continued)

(52) U.S. Cl.
CPC .............. *B63G 8/001* (2013.01); *B63B 22/18* (2013.01); *B63B 35/44* (2013.01); *F02C 1/10* (2013.01);
(Continued)

(58) Field of Classification Search
CPC ........... F02C 1/10; B63G 8/001; B63B 22/18; B63B 22/20; B63B 2035/4433
See application file for complete search history.

(56) References Cited

U.S. PATENT DOCUMENTS

| 1,315,267 A | 9/1919 | White |
| 1,361,561 A | 12/1920 | Yancey |

(Continued)

FOREIGN PATENT DOCUMENTS

| DE | 215277 C | 12/1906 |
| EP | 2660433 A1 | 11/2013 |

(Continued)

OTHER PUBLICATIONS

Heinen, "Hydraulic Drives for Use in Charging Systems, Ballast Systems, or Other Systems of Underwater Vehicles," U.S. Appl. No. 15/173,214, filed Jun. 3, 2016, 40 pages.

(Continued)

*Primary Examiner* — Tulsidas C Patel
*Assistant Examiner* — Thomas K Quigley

(57) ABSTRACT

A system includes a vehicle having a body and a power generation system. The power generation system includes first and second tanks each configured to receive and store a refrigerant under pressure. The power generation system also includes at least one generator configured to generate electrical power based on a flow of the refrigerant between the tanks. The first tank is configured to be cooled by one of ambient air and water to a lower temperature, and the second tank is configured to be warmed by another of the ambient air and the water to a higher temperature. The first tank or associated heat exchanger can be positioned such that the first tank is above the water's surface when a portion of the body breaches the surface. The second tank or associated heat exchanger can be positioned such that the second tank is below the water's surface when a portion of the body breaches the surface.

21 Claims, 9 Drawing Sheets

(51) Int. Cl.
  *B63G 8/00* (2006.01)
  *B63B 22/18* (2006.01)
  *B63B 35/44* (2006.01)
  *H02K 7/18* (2006.01)
  *F03B 3/04* (2006.01)
  *F02C 1/10* (2006.01)

(52) U.S. Cl.
  CPC ............ *F03B 3/04* (2013.01); *H02K 7/1823* (2013.01); *B63B 2035/4433* (2013.01); *B63B 2211/02* (2013.01); *B63G 2008/002* (2013.01); *Y02E 10/223* (2013.01)

(56) References Cited

U.S. PATENT DOCUMENTS

| | | | |
|---|---|---|---|
| 1,421,369 A | 7/1922 | Ardo | |
| 1,710,670 A | 4/1929 | Bonney | |
| 2,000,746 A | 5/1935 | Dray | |
| 2,381,478 A | 8/1945 | Zukor | |
| 2,537,929 A | 1/1951 | Daly et al. | |
| 2,642,693 A | 6/1953 | Broady | |
| 2,720,367 A | 10/1955 | Doolittle | |
| 2,750,794 A | 6/1956 | Downs | |
| 2,783,955 A | 3/1957 | Fitz Patrick | |
| 2,823,636 A | 2/1958 | Gongwer et al. | |
| 2,826,001 A | 3/1958 | Presnell | |
| 2,845,221 A | 7/1958 | Vine et al. | |
| 2,911,792 A * | 11/1959 | Rinia | F02C 1/10 60/39.511 |
| 2,964,874 A | 12/1960 | Ruiz | |
| 3,157,145 A | 11/1964 | Farris et al. | |
| 3,376,588 A * | 4/1968 | Berteaux | B63B 22/20 114/52 |
| 3,698,345 A | 10/1972 | Kreitner | |
| 3,815,555 A | 6/1974 | Tubeuf | |
| 3,818,523 A * | 6/1974 | Stillman, Jr. | B63B 22/18 114/333 |
| 3,901,033 A * | 8/1975 | McAlister | F04F 1/10 60/516 |
| 3,918,263 A | 11/1975 | Swingle | |
| 4,403,154 A * | 9/1983 | Reale | F03B 17/00 290/53 |
| 4,445,818 A | 5/1984 | Ohsaki et al. | |
| 4,577,583 A | 3/1986 | Green, II | |
| 4,850,551 A | 7/1989 | Krawetz et al. | |
| 4,919,637 A | 4/1990 | Fleischmann | |
| 5,134,955 A | 8/1992 | Manfield | |
| 5,291,847 A * | 3/1994 | Webb | B63G 8/08 114/331 |
| 5,303,552 A | 4/1994 | Webb | |
| 5,579,640 A * | 12/1996 | Gray, Jr. | B60K 6/12 60/413 |
| 5,615,632 A | 4/1997 | Nedderman, Jr. | |
| 6,142,092 A | 11/2000 | Coupland | |
| 6,263,819 B1 | 7/2001 | Gorustein et al. | |
| 6,328,622 B1 | 12/2001 | Geery | |
| 8,046,990 B2 * | 11/2011 | Bollinger | H02J 15/006 60/410 |
| 8,069,808 B1 | 12/2011 | Imlach et al. | |
| 8,117,842 B2 * | 2/2012 | McBride | F04B 17/03 60/613 |
| 8,205,570 B1 | 6/2012 | Tureaud et al. | |
| 8,794,003 B2 * | 8/2014 | Mauran | F01K 25/04 60/508 |
| 2006/0059912 A1 | 3/2006 | Romanelli et al. | |
| 2007/0186553 A1 * | 8/2007 | Lin | F01K 15/02 60/650 |
| 2008/0088171 A1 | 4/2008 | Cheng | |
| 2009/0178603 A1 | 7/2009 | Imlach et al. | |
| 2009/0277400 A1 * | 11/2009 | Conry | F01N 5/02 123/2 |
| 2010/0192575 A1 * | 8/2010 | Al-Mayahi | B01D 61/002 60/671 |
| 2010/0327605 A1 | 12/2010 | Andrews | |
| 2011/0051880 A1 * | 3/2011 | Al-Mayahi | F01K 25/06 376/370 |
| 2011/0101579 A1 | 5/2011 | Polakowski et al. | |
| 2011/0167825 A1 * | 7/2011 | Mauran | F01K 25/04 60/670 |
| 2011/0314811 A1 | 12/2011 | Jones et al. | |
| 2012/0091942 A1 | 4/2012 | Jones et al. | |
| 2012/0289103 A1 | 11/2012 | Hudson et al. | |
| 2013/0068973 A1 * | 3/2013 | van Ruth | F03G 7/06 251/11 |
| 2013/0180243 A1 | 7/2013 | Hurtado | |
| 2016/0298498 A1 * | 10/2016 | Kreuger | F03G 6/06 |
| 2018/0119990 A1 * | 5/2018 | Alsadah | F24H 4/04 |

FOREIGN PATENT DOCUMENTS

| | | |
|---|---|---|
| EP | 2698506 A1 | 2/2014 |
| GB | 235363 A | 6/1925 |
| GB | 541775 A | 12/1941 |
| GB | 658070 A | 10/1951 |
| GB | 2422877 A | 8/2006 |
| WO | 2011000062 A1 | 1/2011 |

OTHER PUBLICATIONS

Heinen et al., "Systems and Methods Supporting Periodic Exchange of Power Supplies in Uderwater Vehicles or Other Devices," U.S. Appl. No. 15/264,399, filed Sep. 13, 2016, 51 pages.
Bowen, "A Passive Capture Latch for Odyssey-Class AUVs," Technical Report WHOI-98-12, Jun. 1998, 91 pages, publisher Woods Hole Oceanographic Institution, Woods Hole, MA.
Singh et al., "Docking for an Autonomous Ocean Sampling Network," IEEE Journal of Oceanic Engineering, Oct. 2001, pp. 498-514, vol. 26, No. 4, publisher IEEE, Piscataway, New Jersey.
Bowen et al., "The Nereus Hybrid Underwater Robotic Vehicle for Global Ocean Science Operations to 11,000m Depth," 2008, 10 pages, publisher IEEE, Piscataway, New Jersey.
Hardy et al., "Unmanned Underwater Vehicle (UUV) deployment and retrieval considerations for submarines," Paper on UUV Deployment and Retrieval Options for Submarines, Apr. 2008, 15 pages, publisher BMT Defence Services Ltd., Bath, United Kingdom.
Cowen, "Flying Plug: A Small UUV Designed for Submarine Data Connectivity (U)," Abstract, 1997, 21 pages, publisher PN.
Gish, "Design of an AUV Recharging System," 2004, 134 pages, publisher Massachusetts Institute of Technology, Cambridge, Massachusetts.
Vandenberg, "Manning and Maintainability of a Submarine Unmanned Undersea Vehicle (UUV) Program: A Systems Engineering Case Study," Thesis, Sep. 2010, 137 pages, publisher Naval Postgraduate School, Monterey, California.
Griffiths, "Technology and Applications of Autonomous Underwater Vehicles," 2003, 18 pages, publisher Taylor & Francis, New York, NY.
Galletti di Cadilhac, "Docking Systems," 2003, pp. 93-108, publisher Taylor & Franscis, New York, NY.
Singh et al., "AOSN MURI: Docking for an Autonomous Ocean Sampling Network," Program #: ONR-322 OM/AOSN N00014-95-1-1316, 1998, 6 pages, available at http://www.whoi.edu/DSL/hanu/.
Mosca et al., "Low-Frequency Acoustic Source for AUV Long-Range Communication", iXSea, France, JAMSTEC, Japan, Jun. 2011, 9 pages.
Shimura et al., "Long-Range Time Reversal Communication in Deep Water: Experimental Results", J. Acoust. Soc. Am. 132 (1), Jun. 2012, 5 pages.
NASA, "Utilizing Ocean Thermal Energy in a Submarine Robot", NASA's Jet Propulsion Laboratory, NASA Tech Briefs NP0-43304, Dec. 2008, 4 pages.
Huntsberger et al., "Advanced Energy Storage System for Thermal Engines", California Institute of Technology, Jan. 2013, 16 pages.

(56) References Cited

OTHER PUBLICATIONS

Huntsberger et al., "Slocum-TREC Thermal Glider", California Institute of Technology, Jan. 2012, 16 pages.

Heinen et al., "Apparatus and Method for Periodically Charging Ocean Vessel or Other System Using Thermal Energy Conversion", U.S. Appl. No. 15/173,178, filed Jun. 3, 2016, 54 pages.

Heinen, "Modified CO2 Cycle for Long Endurance Unmanned Underwater Vehicles and Resultant Chirp Acoustic Capability", U.S. Appl. No. 15/091,415, filed Apr. 5, 2016, 40 pages.

International Search Report and Written Opinion of the International Searching Authority dated May 18, 2017 for PCT Application No. PCT/US2016/062518, 12 pages.

Heinen, "Systems and Methods for Power Generation Based on Surface Air-To-Water Thermal Differences", U.S. Appl. No. 15/787,948, filed Oct. 19, 2017, 35 pages.

International Search Report and Written Opinion of the International Searching Authority dated May 29, 2017 for PCT Application No. PCT/US2017/017499, 13 pages.

International Search Report and Written Opinion of the International Search Authority for PCT Patent Application No. PCT/US2017/016976 dated Feb. 12, 2018, 18 pages.

Jones et al., "Novel Thermal Powered Technology for UUV Persistant Surveillance", A Presentation to the ONR Joint Review of Unmanned Systems Technology Development, Feb. 2016, 11 pages.

Chao, "Diurnal Variability, Part I: Global 1-km SST (G1SST), Part II: GHRSST-DV-Argo Obs. Systems", Feb. 2011, 19 pages.

Swean, Jr., "ONR Unmanned Sea Vehicle Technology Development, AUVSI's Unmanned Systems Program Review 2008", Feb. 2008, 34 pages.

Chao, "Thermal Recharging Battery for Underwater Instrumentations", Oct. 2013, 1 page.

Chao, "Autonomous Underwater Vehicles and Sensors Powered by Ocean Thermal Energy", ORE Seminar, Jan. 2016, 1 page.

Huntsberger et al., "Advanced Energy Storage System for Thermal Engines, AUVSI Annual Review", Jet Propulsion Laboratory, California Institute of Technology, Jan. 2013, 16 pages.

\* cited by examiner

SYSTEMS AND METHODS FOR POWER GENERATION BASED ON SURFACE AIR-TO-WATER THERMAL DIFFERENCES

CROSS-REFERENCE TO RELATED APPLICATION AND PRIORITY CLAIM

This application claims priority under 35 U.S.C. § 119(e) to U.S. Provisional Patent Application No. 62/414,567 filed on Oct. 28, 2016. This provisional application is hereby incorporated by reference in its entirety.

TECHNICAL FIELD

This disclosure generally relates to power generation systems, such as power generation systems that operate based on thermal energy conversion. More specifically, this disclosure relates to systems and methods for power generation based on surface air-to-water thermal differences.

BACKGROUND

Unmanned underwater vehicles (UUVs) can be used in a number of applications, such as undersea surveying, recovery, or surveillance operations. However, supplying adequate power to UUVs for prolonged operation can be problematic. For example, one prior approach simply tethers a UUV to a central power plant and supplies power to the UUV through the tether. However, this clearly limits the UUV's range and deployment, and it can prevent the UUV from being used in situations requiring independent or autonomous operation. Another prior approach uses expanding wax based on absorbed heat to generate power, but this approach provides power in very small amounts, typically limited to less than about 200 Watts (W) at a 2.2 Watt-hour (WHr) capacity. Yet another prior approach involves using fuel cells in a UUV to generate power, but fuel cells typically require large packages and substantial space.

SUMMARY

This disclosure provides systems and methods for power generation based on surface air-to-water thermal differences.

In a first embodiment, an apparatus includes first and second tanks each configured to receive and store a refrigerant under pressure. The apparatus also includes at least one generator configured to generate electrical power based on a flow of the refrigerant between the tanks. The first tank is configured to be cooled by one of ambient air and water to a lower temperature, and the second tank is configured to be warmed by another of the ambient air and the water to a higher temperature.

In a second embodiment, a system includes a vehicle having a body and a power generation system. The power generation system includes first and second tanks each configured to receive and store a refrigerant under pressure. The power generation system also includes at least one generator configured to generate electrical power based on a flow of the refrigerant between the tanks. The first tank is configured to be cooled by one of ambient air and water to a lower temperature, and the second tank is configured to be warmed by another of the ambient air and the water to a higher temperature.

In a third embodiment, a method includes generating electrical power based on a flow of refrigerant between first and second tanks, where each of the tanks is configured to receive and store the refrigerant under pressure. The first tank is cooled by one of ambient air and water to a lower temperature, and the second tank is warmed by another of the ambient air and the water to a higher temperature.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

It should be noted that, in the following description, it is assumed underwater vehicles supporting surface air-to-water thermal power generation can dive and perform other functions in a body of water. However, this need not be the case. Other systems can be used that support surface air-to-water thermal power generation without diving to deeper depths underwater. For example, buoys or other devices that constantly remain at or near the surface of a body of water can support surface air-to-water thermal power generation. Thus, while the follow description describes underwater vehicles supporting surface air-to-water thermal power generation, the surface air-to-water thermal power generation systems described in this patent document are not limited to use with underwater vehicles.

Figure 1A:
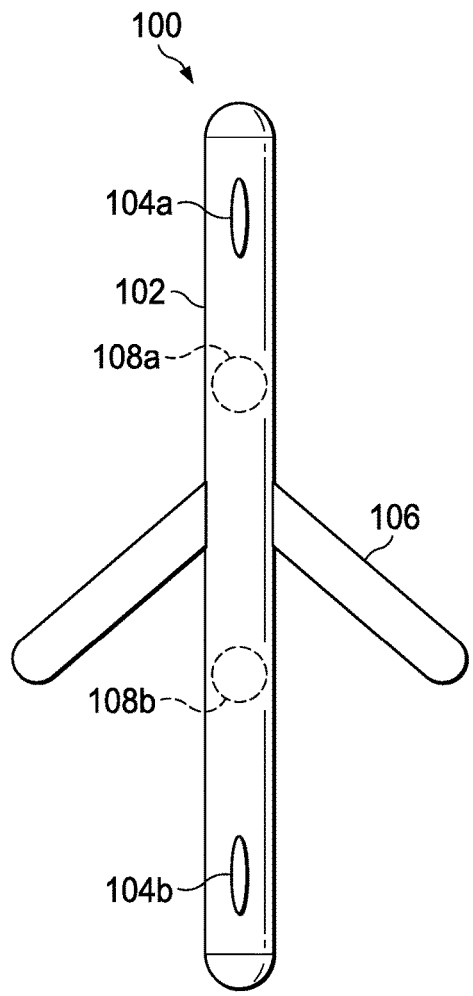
FIGS. 1A through 1D illustrate a first example underwater vehicle that supports surface air-to-water thermal power generation in accordance with this disclosure.
Figure 1B:
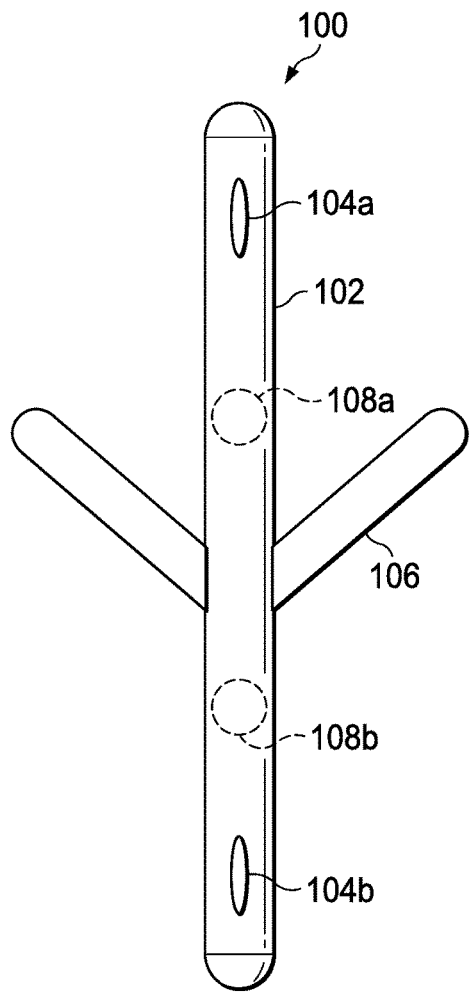
Figure 1C:
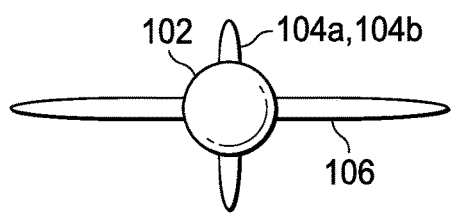
Figure 1D:
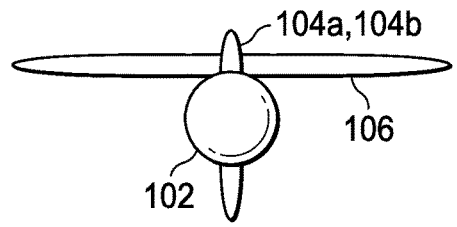

FIGS. 1A through 1D illustrate a first example underwater vehicle 100 that supports surface air-to-water thermal power generation in accordance with this disclosure. In particular, FIGS. 1A and 1B illustrate the underwater vehicle 100 in different modes of operation, and FIGS. 1C and 1D illustrate alternate positions for certain components of the underwater vehicle 100. In this example, the vehicle 100 represents an unmanned underwater vehicle or other device that can function as both a buoy and a glider within an ocean or other body of water. The vehicle 100 can be used to support various functions, such as undersea surveying, recovery, or surveillance operations.

As shown in FIGS. 1A and 1B, the vehicle 100 includes a body 102 having fins 104a-104b and wings 106. The body 102 represents any suitable structure configured to encase, protect, or otherwise contain other components of the vehicle 100. The body 102 can be formed from any suitable material(s) and in any suitable manner. As a particular example, the body 102 may include a neutrally-buoyant composite of G10 fiberglass or other material coated with protective ultraviolet paint. The body 102 can be formed so that the vehicle 100 is able to withstand extremely elevated pressures found at deep depths in an ocean or other body of water. In some embodiments, the body 102 can allow the vehicle 100 to operate at depths of up to 1,000 meters or more.

The fins 104a-104b represent projections from the body 102 that help to stabilize the body 102 during travel. Each of the fins 104a-104b can be formed from any suitable material(s) and in any suitable manner. As a particular example, each of the fins 104a-104b may include a neutrally-buoyant composite of G10 fiberglass or other material coated with protective ultraviolet paint. Also, each of the fins 104a-104b can have any suitable size, shape, and dimensions. Further, at least some of the fins 104a-104b can be movable or adjustable to help alter the course of the body 102 and to steer the body 102 through water during travel. In addition, the numbers and positions of the fins 104a-104b shown here are examples only, and any numbers and positions of fins can be used to support desired operations of the vehicle 100.

In some embodiments, the underwater vehicle 100 can both ascend and descend within a body of water during use. In these embodiments, the fins 104a can be used to steer the vehicle 100 while ascending, and the fins 104b can be used to steer the vehicle 100 while descending. Moreover, when the vehicle 100 is ascending, the fins 104a can be used to control the pitch of the vehicle 100, and a differential between the fins 104a can be used to control the roll of the vehicle 100. Similarly, when the vehicle 100 is descending, the fins 104b can be used to control the pitch of the vehicle 100, and a differential between the fins 104b can be used to control the roll of the vehicle 100.

The wings 106 support gliding movement of the vehicle 100 underwater. For example, in some instances, the vehicle 100 can be placed into a body of water and programmed to travel short or long distances to reach desired destinations. When traveling, the vehicle 100 can be positioned generally horizontal, and the wings 106 help to enable the vehicle 100 to travel short or long distances using reduced or minimal amounts of energy. Once in a desired location, the wings 106 can be stowed or used when the vehicle 100 ascends or descends. The wings 106 are also moveable to support different directions of travel. For example, the wings 106 are swept downward in FIG. 1A when the vehicle 100 is ascending, and the wings 106 are swept upward in FIG. 1B when the vehicle 100 is descending. In this way, the wings 106 help to facilitate easier or more rapid movement of the vehicle 100 while ascending or descending.

Each of the wings 106 can be formed from any suitable material(s) and in any suitable manner. As a particular example, each of the wings 106 may include a neutrally-buoyant composite of G10 fiberglass or other material coated with protective ultraviolet paint. Also, each of the wings 106 can have any suitable size, shape, and dimensions. In addition, the number and positions of the wings 106 shown here are examples only, and any number and positions of wings can be used to support desired operations of the vehicle 100.

The underwater vehicle 100 may further include one or more ballasts 108a-108b, which help to control the center of gravity of the vehicle 100. As described in more detail below, material (such as carbon dioxide or other refrigerant in tanks) can move within a power supply or other portion of the vehicle 100, and that movement can alter the center of gravity of the vehicle 100. Underwater gliders can be particularly susceptible to changes in their centers of gravity, so the vehicle 100 can adjust one or more of the ballasts 108a-108b as needed or desired (such as during ascent, descent, or horizontal travel) to maintain the center of gravity of the vehicle 100 substantially at a desired location. The adjustment can be made along the long axis of the vehicle 100 so as to balance the pitch of the vehicle 100 during ascent, descent, or horizontal travel.

Each ballast 108a-108b includes any suitable structure configured to modify the center of gravity of an underwater vehicle. As an example, each ballast 108a-108b can include a mass that is moved using a lead screw and a motor or other mechanism. As a particular example, a ballast capable of operation at depths of 1,000 meters or more while acting as a pitch trim and moving a 100 gram mass can be used. Other implementations of each ballast 108a-108b can include use of a displacement piston pump or conventional approaches for pumping water into and out of a ballast tank. Note that the number and positions of the ballasts 108a-108b shown here are examples only, and any number and positions of ballasts can be used in the vehicle 100.

FIGS. 1C and 1D illustrate different alternate end views of the underwater vehicle 100. In FIG. 1C, the wings 106 are positioned and extend from the body 102 along a line through a center of the body 102. In FIG. 1D, the wings 106 are positioned and extend from the body 102 along a line tangential to the body 102. Either of these positions can be used for the wings 106 in FIGS. 1A and 1B. In either case, the wings 106 can be stowed in a folded position where the wings 106 extend along the length of the body 102 and later unfolded before, during, or after deployment. Stowing the wings 106 along the length of the body 102 allows the vehicle 100 to convert to a buoy-type mode of operation, such as after transit to desired locations (where, during transit, the wings 106 can be deployed as shown in FIGS. 1A and 1B). The fins 104a-104b can also be utilized in periodic ascents and descents to maneuver the vehicle 100 in order to maintain geographic position.

Figure 2A:
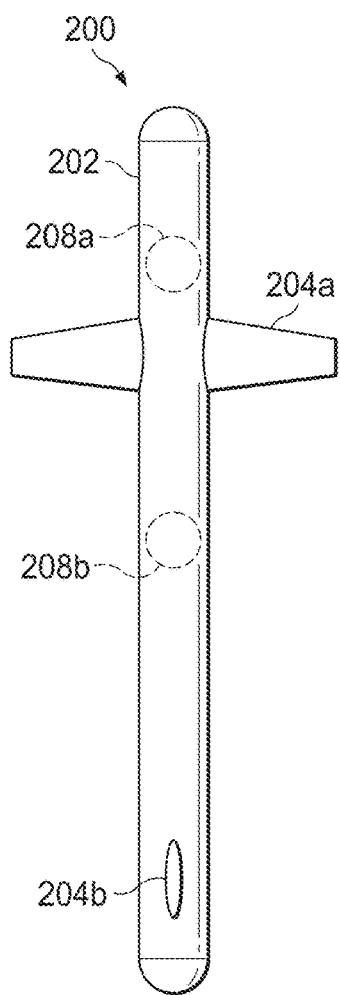
FIGS. 2A through 2C illustrate a second example underwater vehicle that supports surface air-to-water thermal power generation in accordance with this disclosure.
Figure 2B:
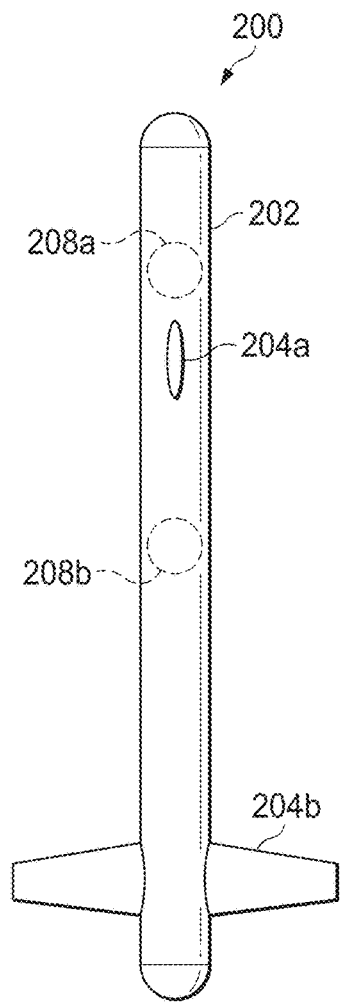
Figure 2C:
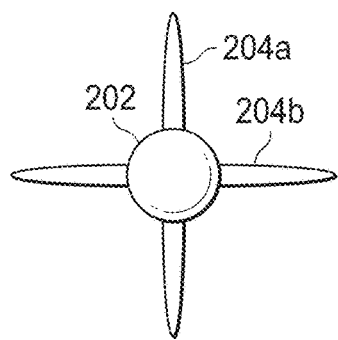

FIGS. 2A through 2C illustrate a second example underwater vehicle 200 that supports surface air-to-water thermal power generation in accordance with this disclosure. In this example, the vehicle 200 represents an unmanned underwater vehicle or other device that can function as a buoy within an ocean or other body of water. The vehicle 200 can be used to support various functions, such as undersea surveying, recovery, or surveillance operations.

As shown in FIGS. 2A through 2C, the underwater vehicle 200 includes a body 202 and fins 204a-204b. The body 202 represents any suitable structure configured to encase, protect, or otherwise contain other components of the vehicle 200. The body 202 can be formed from any suitable material(s), such as a neutrally-buoyant composite of G10 fiberglass or other material coated with protective ultraviolet paint, and in any suitable manner. The fins 204a-204b represent projections from the body 202 that help to stabilize the body 202 during travel. Each of the fins 204a-204b can be formed from any suitable material(s), such as a neutrally-buoyant composite of G10 fiberglass or other material coated with protective ultraviolet paint, and in any suitable manner. Also, each of the fins 204a-204b can have any suitable size, shape, and dimensions. Further, at least some of the fins 204a-204b can be movable or adjustable to help alter the course of the body 202 and to steer the body 102 through water during travel. In addition, the numbers and positions of the fins 204a-204b shown here are examples only, and any numbers and positions of fins can be used to support desired operations of the vehicle 200. The fins 204a-204b can be utilized in periodic ascents and descents to maneuver the vehicle 200 in order to maintain geographic position. The vehicle 200 may further include one or more ballasts 208a-208b, which help to control the center of gravity of the vehicle 200. Each ballast 208a-208b can, for instance, include a mass that is moved using a lead screw and a motor or other mechanism, a displacement piston pump, or a ballast tank.

As can be seen in FIGS. 2A through 2C, the underwater vehicle 200 lacks wings used to support gliding of the vehicle 200 through water. As a result, the vehicle 200 represents a device that can function as a buoy but generally not as a glider within an ocean or other body of water.

In some embodiments, the underwater vehicle 200 can function similar to a hydrometer and need not include any fins. In these embodiments, the underwater vehicle 200 can simply reside at the surface of a body of water and need not travel up and down across a wide range of depths.

As described in more detail below, the underwater vehicles 100, 200 include a power generation system that operates based on the flow of refrigerant between tanks. The tanks have a temperature differential (or a temperature-based pressure differential) that facilitates movement of the refrigerant from one tank to another. The flow of refrigerant causes at least one generator to generate electrical power, which can be used immediately or stored for later use.

In order to achieve a satisfactory temperature or pressure differential between the tanks, each underwater vehicle 100, 200 is designed so that one end of the underwater vehicle 100, 200 breaches the surface of a body of water and extends into the ambient atmosphere. One refrigerant tank can be positioned within the end of the underwater vehicle 100, 200 extending into the ambient atmosphere, or that tank can be thermally coupled to a heat exchanger that is positioned within the end of the underwater vehicle 100, 200 extending into the ambient atmosphere. Depending on the design, a large portion (such as five to ten feet) of the underwater vehicle can extend above the water's surface. Another refrigerant tank can be positioned within the underwater vehicle 100, 200 so that it remains underwater and thermally contacts the water.

In some use cases, the ambient air around the exposed end of the underwater vehicle 100, 200 is colder than the water around the underwater vehicle 100, 200. Radiative and convective cooling of the exposed end of the underwater vehicle 100, 200 can be used to lower the temperature of one tank, while the other tank can be warmer due to the warmer temperature of the water. Even if the water has a temperature of around 5°-10° C., the radiative and convective cooling can achieve a temperature below 0° C. This temperature difference (or the resulting temperature-based pressure difference) facilitates movement of the refrigerant from the warmer tank to the colder tank and the generation of power based on that refrigerant flow. Similar types of operations can also occur if the ambient air around the exposed end of the underwater vehicle 100, 200 is warmer than the water around the underwater vehicle 100, 200. Additional details regarding this approach are provided below.

The ability to generate power based on thermal differences between surface air and water can provide various advantages depending on the implementation and vehicle use. For example, the power generation capabilities of the vehicles 100, 200 can depend on obtaining an adequate temperature or temperature-based pressure difference between two tanks of refrigerant. It may be more difficult in some areas for the vehicles 100, 200 to dive to a sufficient depth in order to obtain colder water and achieve the adequate temperature or temperature-based pressure difference between the tanks. This may be true, for example, at mid to high latitudes where there is less of a temperature difference between temperatures at lower dive depths and surface temperatures. For example, depending on the time of day and the time of year, there can be a 25° C. difference between the water temperature at the surface of a body of water and the water temperature at a depth of 1,000 meters at lower latitudes. At higher latitudes, there may be less than a 5° or 10° C. difference between the water temperature at the surface of a body of water and the water temperature at a depth of 1,000 meters.

By generating power based on thermal differences between surface air and water, the vehicles 100, 200 may be able to generate adequate power over a wider range of latitudes. This is because a larger temperature difference can be obtained between the water temperature at the surface of a body of water and the ambient air. Moreover, the ability to use thermal differences at or near the surface of a body of water may reduce or even eliminate the need for the vehicles 100, 200 to dive to a lower depth in order to obtain colder water to support power generation. This can save quite a bit of time when operating the vehicles 100, 200 since a deep dive for power generation can take a number of hours. This can also reduce the amount of electrical power used by the vehicles 100, 200 since the propulsion systems of the vehicles 100, 200 are not used to perform the dives as often.

Although FIGS. 1A through 2C illustrate examples of underwater vehicles 100 and 200 that support surface air-to-water thermal power generation, various changes may be made to FIGS. 1A through 2C. For example, these figures illustrate example underwater vehicles only, and the surface air-to-water thermal power generation systems described in this patent document can be used in any other suitable device or system.

Figure 3:
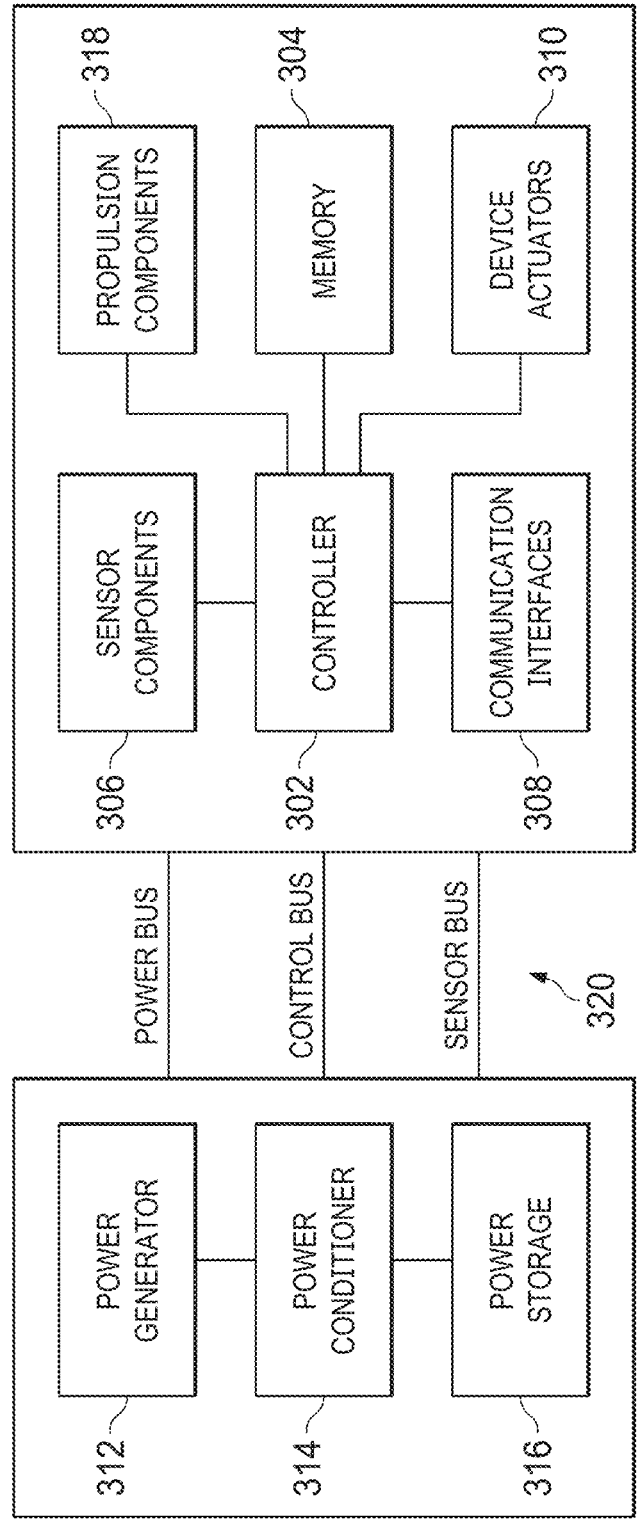
FIG. 3 illustrates example components of an underwater vehicle that supports surface air-to-water thermal power generation in accordance with this disclosure.

FIG. 3 illustrates example components of an underwater vehicle 300 that supports surface air-to-water thermal power generation in accordance with this disclosure. The underwater vehicle 300 can, for example, represent either of the underwater vehicles 100 and 200 described above. The components shown in FIG. 3 can therefore represent internal or other components within either of the vehicles 100 and 200 that were not shown in FIGS. 1A through 2C.

As shown in FIG. 3, the vehicle 300 includes at least one controller 302 and at least one memory 304. The controller 302 controls the overall operation of the vehicle 300 and can represent any suitable hardware or combination of hardware and software/firmware for controlling the vehicle 300. For example, the controller 302 can represent at least one processor configured to execute instructions obtained from the memory 304. The controller 302 may include any suitable number(s) and type(s) of processors or other computing or control devices in any suitable arrangement. Example types of controllers 302 include microprocessors, microcontrollers, digital signal processors, field programmable gate arrays, application specific integrated circuits, and discrete circuitry.

The memory 304 stores data used, generated, or collected by the controller 302 or other components of the vehicle 300. Each memory 304 represents any suitable structure(s) configured to store and facilitate retrieval of information (such as data, program code, and/or other suitable information on a temporary or permanent basis). Some examples of the memory 304 can include at least one random access memory, read only memory, Flash memory, or any other suitable volatile or non-volatile storage and retrieval device(s).

The vehicle 300 in this example also includes one or more sensor components 306 and one or more communication interfaces 308. The sensor components 306 include sensors that can be used to sense any suitable characteristics of the vehicle 300 itself or the environment around the vehicle 300. For example, the sensor components 306 can include a position sensor, such as a Global Positioning System (GPS) sensor, which can identify the position of the vehicle 300. This can be used, for instance, to help make sure that the vehicle 300 is following a desired path or is maintaining its position at or near a desired location. The sensor components 306 can also include pressure sensors used to estimate a depth of the underwater vehicle 300. The sensor components 306 can further include audio sensors for capturing audio signals, photodetectors or other cameras for capturing video signals or photographs, or any other or additional components for capturing any other or additional information. Each sensor component 306 includes any suitable structure for sensing one or more characteristics.

The communication interfaces 308 support interactions between the vehicle 300 and other devices or systems. For example, the communication interfaces 308 can include at least one radio frequency (RF) or other transceiver configured to communicate with one or more satellites, airplanes, ships, or other nearby or distant devices. The communication interfaces 308 allow the vehicle 300 to transmit data to one or more external destinations, such as information associated with data collected by the sensor components 306. The communication interfaces 308 also allow the vehicle 300 to receive data from one or more external sources, such as instructions for other or additional operations to be performed by the vehicle 300 or instructions for controlling where the vehicle 300 operates. Each communication interface 308 includes any suitable structure(s) supporting communication with the vehicle 300.

The vehicle 300 may include one or more device actuators 310, which are used to adjust one or more operational aspects of the vehicle 300. For example, the device actuators 310 can be used to move the fins 104a-104b, 204a-204b of the vehicle while the vehicle is ascending or descending. The device actuators 310 can also be used to control the positioning of the wings 106 to control whether the wings 106 are stowed or swept upward or downward (depending on the direction of travel). Each device actuator 310 includes any suitable structure for physically modifying one or more components of an underwater vehicle. Note, however, that the vehicle 300 need not include device actuators 310, such as when the vehicle 300 lacks fins or wings.

The vehicle 300 further includes a power generator 312, a power conditioner 314, and a power storage 316. The power generator 312 generally operates to create electrical energy. In particular, the power generator 312 can operate based on thermal differences between ambient air and water. The power generator 312 includes any suitable structure configured to generate electrical energy based on thermal differences.

The power conditioner 314 is configured to condition or convert the power generated by the power generator 312 into a suitable form for storage or use. For example, the power conditioner 314 can receive a direct current (DC) signal from the power generator 312, filter the DC signal, and store power in the power storage 316 based on the DC signal. The power conditioner 314 can also receive power from the power storage 316 and convert the power into suitable voltage(s) and current(s) for other components of the vehicle 300. The power conditioner 314 includes any suitable structure(s) for conditioning or converting electrical power.

The power storage 316 is used to store electrical power generated by the power generator 312 for later use. The power storage 316 represents any suitable structure(s) for storing electrical power, such as one or more batteries or super-capacitors.

The vehicle 300 may include one or more propulsion components 318, which represent components used to physically move the vehicle 300 through water. The propulsion components 318 can represent one or more motors or other propulsion systems. In some embodiments, the propulsion components 318 can be used only when the vehicle 300 is traveling between a position at or near the surface and a desired depth. During other time periods, the propulsion components 318 can be deactivated. Of course, other embodiments can allow the propulsion components 318 to be used at other times, such as to help maintain the vehicle 300 at a desired location or to help move the propulsion components 318 to avoid observation or detection. Note, however, that the vehicle 300 need not include propulsion components 318, such as when the vehicle 300 represents a passive buoy.

Various buses 320 can be used to interconnect components of the vehicle 300. For example, a power bus can transport power to various components of the vehicle 300. The power generated by the power generator 312 and the power stored in the power storage 316 can be supplied to any of the components in FIG. 3. For instance, electrical power can be provided to the controller 302 and memory 304 to facilitate computations and instruction execution by the controller 302 and data storage/retrieval by the memory 304. Electrical power can also be provided to the sensor components 306, communication interfaces 308, and device actuators 310 in order to support sensing, communication, and actuation operations. In addition, electrical power can be provided to the propulsion components 318 in order to support movement of the vehicle 300. The power bus may have a range of voltages and purposes, such as 5V, 12V, and 24V main drive power for servos and other device actuators (such as ballasting). A control bus can transport control signals for various components, such as control signals generated by the controller 302. A sensor bus can transport sensor data for various components.

Although FIG. 3 illustrates one example of components of an underwater vehicle 300 that supports surface air-to-water thermal power generation, various changes may be made to FIG. 3. For example, various components in FIG. 3 can be combined, further subdivided, rearranged, or omitted or additional components can be added according to particular needs.

Figure 4A:
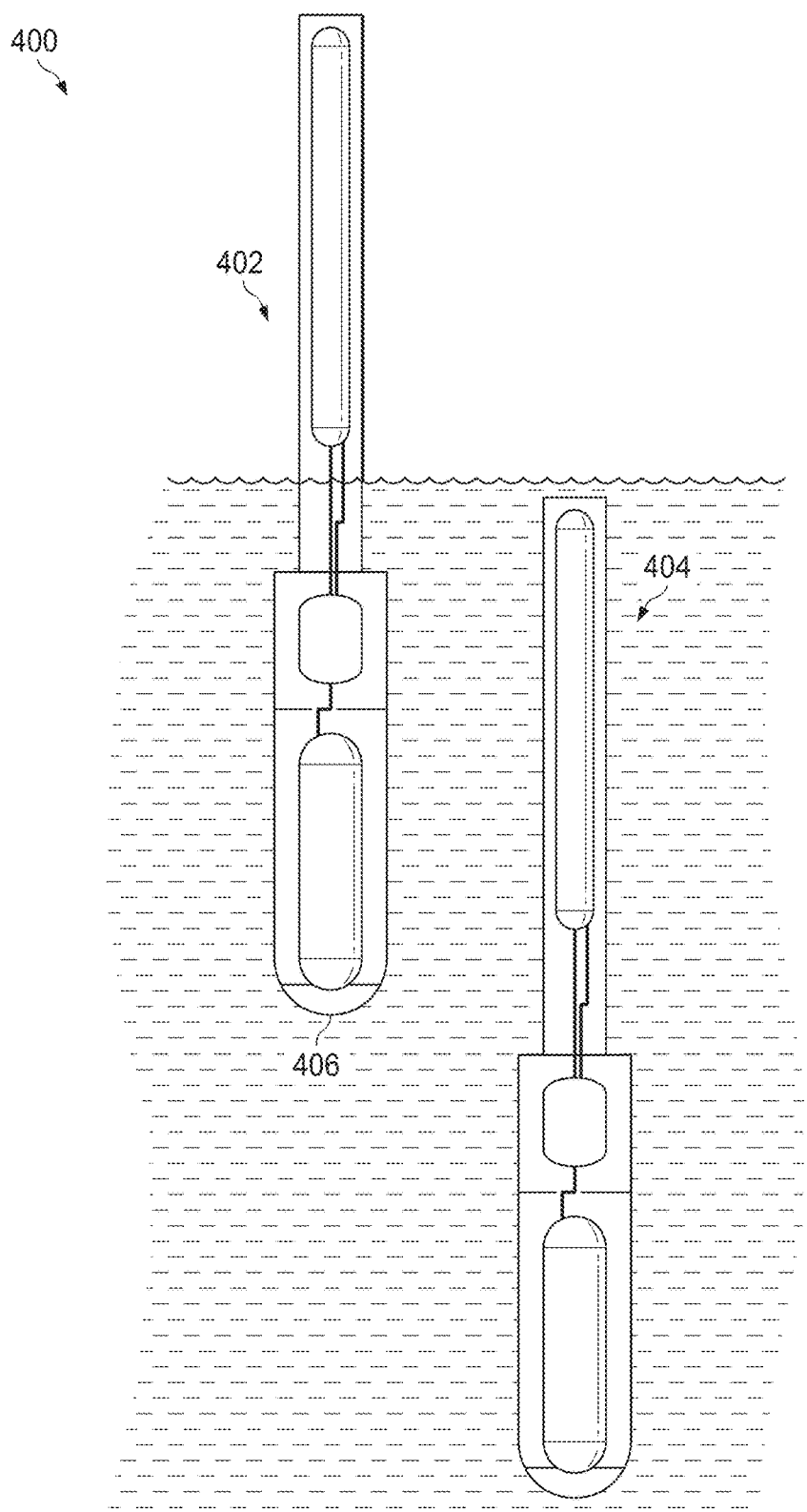
FIGS. 4A and 4B illustrate example uses of an underwater vehicle that supports surface air-to-water thermal power generation in accordance with this disclosure.
Figure 4B:
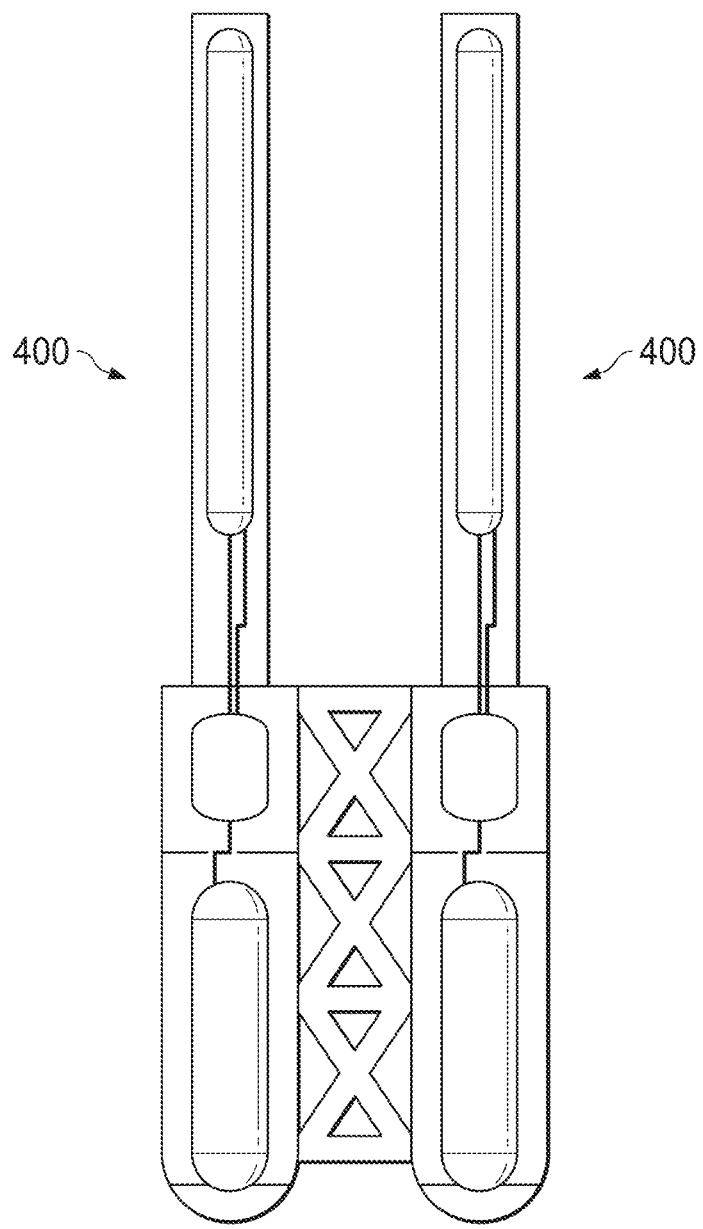

FIGS. 4A and 4B illustrate example uses of an underwater vehicle that supports surface air-to-water thermal power generation in accordance with this disclosure. Note that while the underwater vehicle in FIGS. 4A and 4B represents a buoy, the underwater vehicle in FIGS. 4A and 4B can represent any suitable underwater vehicle that supports surface air-to-water thermal power generation, including any of those described above.

As shown in FIG. 4A, an underwater vehicle 400 can assume one of multiple locations when at or near the surface of a body of water. For example, in position 402, the underwater vehicle 400 has breached the water's surface, and one end of the underwater vehicle 400 is extending above the water. Depending on the environment, in this position, radiative and convective cooling can be used to cool one refrigerant tank (either directly or via a heat exchanger), while another refrigerant tank can be warmer due to the warmer temperature of the water. Although the water may still be extremely cold, the air above the water can be even colder, which helps to create a satisfactory temperature/pressure differential between the tanks in order to generate power. Alternatively, the water may be colder than the air above the water.

In position 404, the underwater vehicle 400 has submerged and is near the surface of the water so that both ends are now under the water's surface. This shallow dive can be performed for various reasons. For example, a shallow dive can help to remove any ice that forms on the exposed end of the underwater vehicle 400 when in position 402. During this shallow dive, the amount of refrigerant in the tanks can also be substantially equalized, such as by exposing both tanks to the same water temperature, so that the underwater vehicle 400 can rise again and perform another power generation cycle. The shallow dive can be performed during less desirable power generation conditions, such as during daylight hours when the ambient air is warmer or during times when there is little wind and therefore less convective cooling.

The underwater vehicle 400 in this example represents a buoy with a larger base and a smaller upper portion. The underwater vehicle 400 also lacks fins and wings. Note that this form factor represents one possible design for the underwater vehicle 400, but the underwater vehicle 400 can have other designs. Also, a ballast 406 is provided here at a bottom of the underwater vehicle 400. The ballast 406 can help to override the changes in the center of gravity caused by refrigerant flow between the tanks in the underwater vehicle 400.

As shown in FIG. 4B, it is possible to couple multiple instances of the underwater vehicle 400 (or at least multiple instances of the power generation system) together to form a larger system. In this example, there are two buoys or power generation systems connected together, although other numbers of buoys or power generation systems can be connected. The use of multiple buoys or power generation systems can allow for larger amounts of power generation. The use of multiple buoys or power generation systems can also help to reduce changes to the overall system's center of gravity.

Although FIGS. 4A and 4B illustrate example uses of an underwater vehicle that supports surface air-to-water thermal power generation, various changes may be made to FIGS. 4A and 4B. For example, an underwater vehicle can be used in any other suitable manner. As a particular example, as noted above, an underwater vehicle can also dive to deeper depths to perform various functions.

Figure 5:
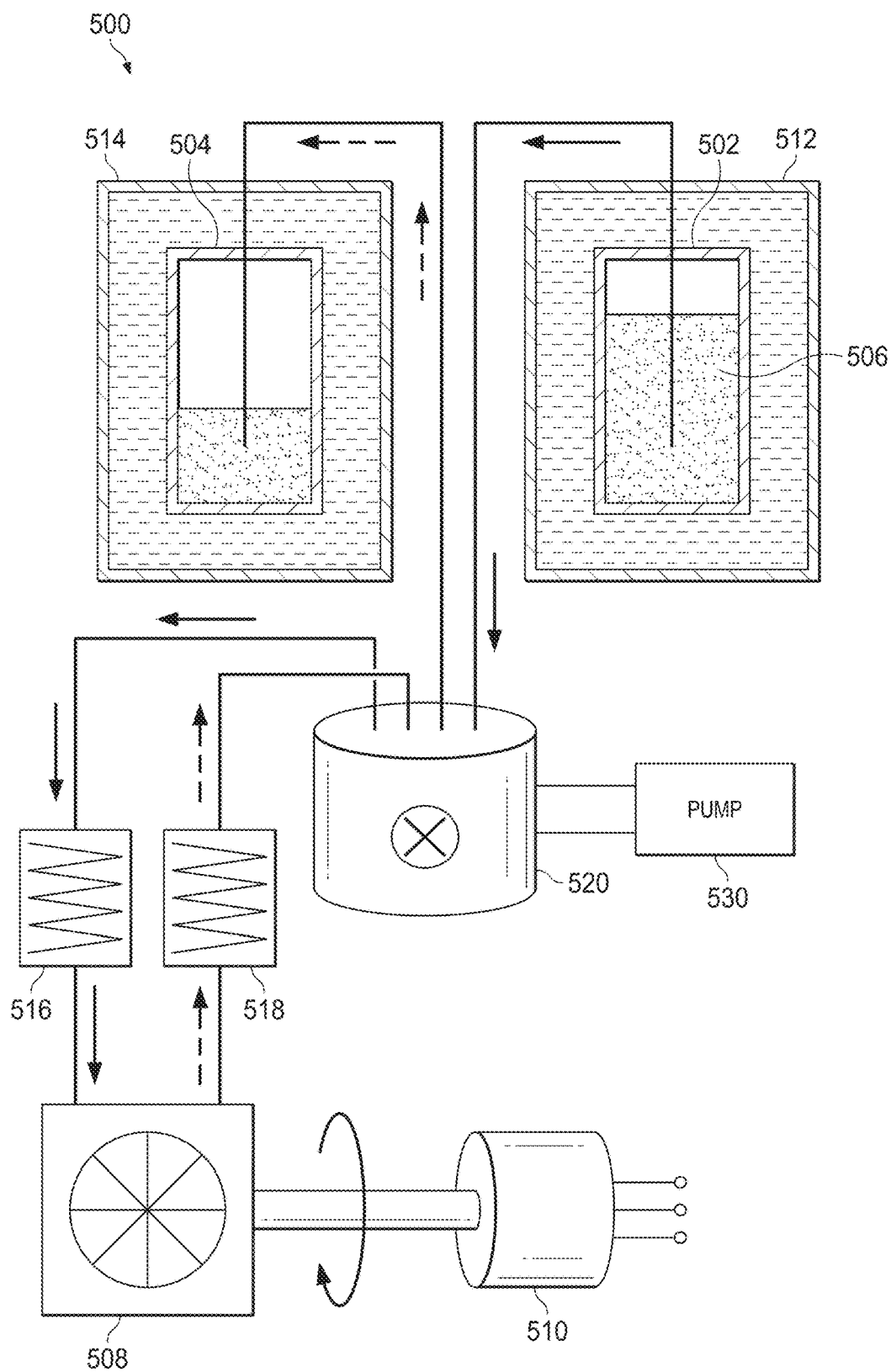
FIGS. 5 and 6 illustrate example power generation systems that support surface air-to-water thermal power generation in accordance with this disclosure.
Figure 6:
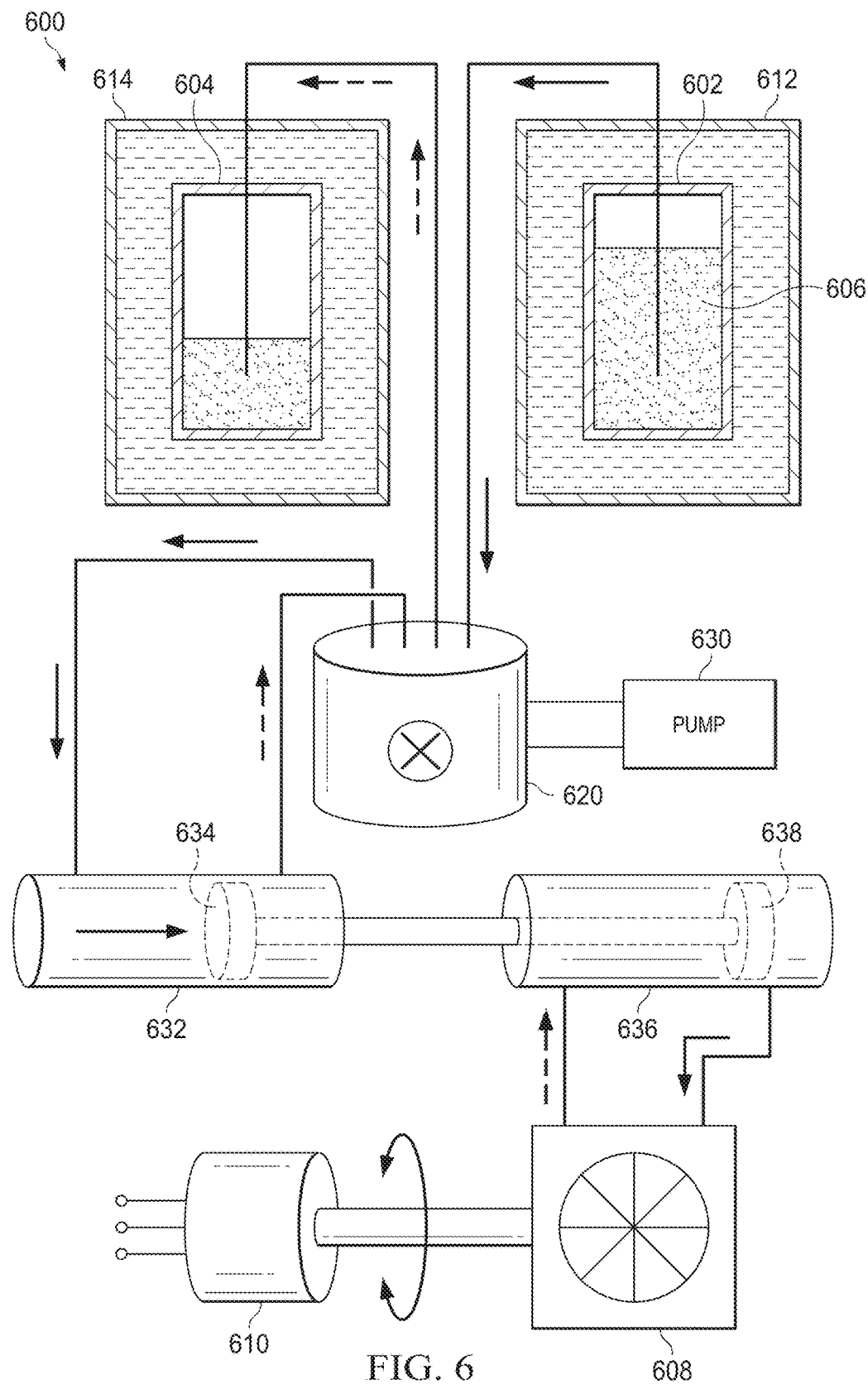

FIGS. 5 and 6 illustrate example power generation systems 500, 600 that support surface air-to-water thermal power generation in accordance with this disclosure. In particular, the power generation systems 500, 600 operate by creating a flow of refrigerant between tanks, and the refrigerant flow is used to generate electrical power.

As shown in FIG. 5, the power generation system 500 generally employs a Carnot-Brayton cycle involving two tanks 502 and 504. A refrigerant 506 is transferred from one tank 502 to the other tank 504 and passes through a turbine 508, which turns a generator 510 to generate electrical power. Each tank 502 or 504 is configured to hold the refrigerant 506 under pressure.

Each tank 502 and 504 includes any suitable structure configured to hold a refrigerant under pressure. The refrigerant 506 includes any suitable fluid used to transfer heat between tanks, such as gaseous or liquid carbon dioxide. The turbine 508 includes any suitable structure configured to turn in response to a refrigerant flow. The generator 510 includes any suitable structure for generating electrical energy, such as a Pelton turbine or a brushless DC (BLDC) generator.

The power generation system 500 can also include optional heat exchangers 512 and 514. Each heat exchanger 512 and 514 can be used to exchange heat between one of the tanks 502 and 504 and the surrounding environment (air or water). For example, the heat exchanger 512 around the tank 502 in FIG. 5 can exchange heat with the water around a submerged end or other submerged portion of the underwater vehicle, while the heat exchanger 514 around the tank 504 in FIG. 5 can exchange heat with air around an exposed end or other exposed portion of the underwater vehicle. The tank 504 and the heat exchanger 514 can be positioned in the exposed end or other exposed portion of the underwater vehicle, or the heat exchanger 514 can be positioned in the exposed portion of the underwater vehicle while the tank 504 is lower (possibly below the waterline). Similarly, the tank 502 and the heat exchanger 512 can be positioned in the submerged end or other submerged portion of the underwater vehicle, or the heat exchanger 512 can be positioned in the submerged portion of the underwater vehicle while the tank 502 is higher (possibly above the waterline).

Each heat exchanger 512 and 514 includes any suitable structure for receiving thermal energy from or providing thermal energy to a structure. Each heat exchanger 512 and 514 can, for example, represent a structure containing glycol or other liquid-based heat transfer agent. In particular embodiments, the glycol or other liquid-based heat transfer agent can freely circulate within a structure containing the agent due to density changes of the agent. The heat exchanger 514 can also represent one or more heat pipes extending from the tank 504 to an area where heat can be convectively removed from the heat pipe(s).

Note that the use of two heat exchangers 512 and 514 is not required here. For example, the tank 502 can be warmed by exposing the tank 502 directly to water, and/or the tank 504 can be cooled by exposing the tank 504 directly to ambient air. Also note that the shapes of the heat exchanger 512 and 514 can differ from those shown, such as when the heat exchanger 514 extends much farther upward so that it is exposed more to the ambient surface air.

To facilitate power generation, two heat exchangers 516 and 518 can be used with the turbine 508. The heat exchanger 516 can function as an evaporator to heat the refrigerant 506 into vapor before the vapor passes through the turbine 508. The heat exchanger 518 can function as a condenser to cool the vapor into liquid refrigerant 506 after the vapor passes through the turbine 508. Each heat exchanger 516 and 518 includes any suitable structure for passing heat to or receiving heat from a refrigerant flow.

The evaporation of the refrigerant 506 may be one cause of ice formation on a portion of the underwater vehicle (such as the exposed portion). Note that ice creation and heat for condensation can be part of the overall thermodynamic properties of the system. For example, an underwater vehicle can rely on the ice creation as part of its overall buoyancy, such as when latent heat during evaporation is used to create ice at depth as part of its buoyancy balance.

A valve assembly 520 allows selective connection of various components in FIG. 5 to control the flow of refrigerant 506 in the system 500. In FIG. 5, for example, the large arrows with solid lines represent the transport of refrigerant 506 from the tank 502 to the turbine 508 through the valve assembly 520, and the large arrows with dashed lines represent the transport of refrigerant 506 from the turbine 508 to the tank 504 through the valve assembly 520. If needed or desired, the valve assembly 520 can change the refrigerant flow, such as to reverse the process. The valve assembly 520 includes any suitable structure for selectively controlling refrigerant flow, such as a crossover valve assembly. The valve assembly 520 can be controlled in any suitable manner. For example, in some embodiments, the controller 302 of an underwater vehicle 300 can control the valve assembly 520 as part of the overall control of the vehicle 300.

Note that FIG. 5 shows one phase of a power generation cycle in which the refrigerant 506 is transferred from the tank 502 to the tank 504. Another phase of the power generation cycle involves the refrigerant 506 being transferred from the tank 504 back to the tank 502. This other phase of the power generation cycle may or may not involve passing the refrigerant 506 through the turbine 508, so power may or may not be generated during this other phase.

Various approaches can be used to transfer the refrigerant 506 from the tank 504 back to the tank 502. For example, as described above, the vehicle containing the tanks 502 and 504 can dive to a shallow depth, and water can be used to substantially equalize the temperatures or pressures of the tanks 502 and 504. The valve assembly 520 or another valve (not shown) can then couple the tanks 502-504 directly to one another so that some of the refrigerant 506 flows into the tank 502. In some embodiments, given adequate time and equal temperatures of the tanks, the amount of refrigerant 506 in the tanks 502 and 504 can substantially equalize.

In other embodiments, the tank 504 can be physically positioned above the tank 502, and the valve assembly 520 or another valve (not shown) can couple the tanks 502-504 directly to one another. Gravity can then be used to allow the refrigerant 506 to flow from the tank 504 into the tank 502.

In still other embodiments, a pump 530 can be used to pump the liquid refrigerant 506 from the tank 504 into the tank 502, such as via appropriate configuration of the valve assembly 520. The pump 530 can also be coupled directly to the tanks 502-504, so no configuration of the valve assembly 520 would be needed there.

In yet other embodiments, an underwater vehicle can be designed so that either end can project above the water's surface, and the same process shown in FIG. 5 can be reversed to force the refrigerant from the tank 504 into the tank 502. Various other components in FIG. 5 (such as the heat exchangers) can be replicated to support proper evaporation/condensation of the refrigerant 506 flowing from the tank 504 to the tank 502. Alternatively, the valve assembly 520 can allow refrigerant flow through the heat exchangers 516 and 518 in the same direction regardless of whether the refrigerant 506 is entering or exiting the tank 502.

Note that these represent example ways in which the refrigerant 506 can be transferred from the tank 504 to the tank 502 so that another power generation cycle can occur. Any other suitable technique can be used to transfer the refrigerant 506 from the tank 504 to the tank 502.

As shown in FIG. 6, the power generation system 600 contains many similar components as the power generation system 500. For example, the power generation system 600 includes tanks 602 and 604, a refrigerant 606, a turbine 608, and a generator 610. The power generation system 600 also includes optional heat exchangers 612 and 614, a valve assembly 620, and an optional pump 630. These components may be the same as or similar to the corresponding components in FIG. 5.

In FIG. 6, the turbine 608 is not driven directly by the refrigerant 606. Rather, the refrigerant 606 flows through a cylinder 632 and causes a piston 634 in the cylinder 632 to move. A hydraulic cylinder 636 is filled with a hydraulic fluid and includes a piston 638 that is connected to the piston 634. Movement of the piston 634 therefore causes a corresponding movement of the piston 638.

When the piston 634 moves left to right in FIG. 6, the piston 638 also moves left to right and pushes hydraulic fluid clockwise through the turbine 608. When the piston 634 moves right to left in FIG. 6, the piston 638 also moves right to left and pushes hydraulic fluid counterclockwise through the turbine 608. In either case, the turbine 608 turns, causing the generator 610 to generate electrical power. The valve assembly 620 can be used here to change the direction of refrigerant flow through the cylinder 632, thereby controlling the direction of hydraulic fluid flow through the cylinder 636. While described as cylinders, elements 632 and 636 in FIG. 6 can have any other suitable size, shape, and dimensions. Also, each piston 634 and 638 can have any suitable size, shape, and dimensions.

Note that FIG. 6 shows one phase of a power generation cycle in which the refrigerant 606 is transferred from the tank 602 to the tank 604. Another phase of the power generation cycle involves the refrigerant 606 being transferred from the tank 604 back to the tank 602. This phase may or may not involve moving the pistons 634 and 638, so power may or may not be generated during this other phase.

As described above, various approaches can be used to transfer the refrigerant 606 from the tank 604 back to the tank 602. In some embodiments, the vehicle containing the tanks 602 and 604 can perform a dive so that the tanks 602 and 604 substantially equalize in temperature or pressure, causing some of the refrigerant 606 to flow into the tank 602 and substantially equalizing the amount of refrigerant 606 in the tanks. In other embodiments, the tank 604 can be physically positioned above the tank 602, and the valve assembly 620 or another valve (not shown) can couple the tanks 602-604 directly to one another so that gravity causes the refrigerant 606 to flow from the tank 604 into the tank 602. In still other embodiments, the pump 630 can be used to pump the liquid refrigerant 606 from the tank 604 into the tank 602, such as via appropriate configuration of the valve assembly 620 or through direct connections to the tanks. In yet other embodiments, an underwater vehicle can be designed so that either end can project above the water's surface, and the same process shown in FIG. 6 can be reversed to force the refrigerant from the tank 604 into the tank 602.

Depending on how the refrigerant 606 is transferred from the tank 604 back to the tank 602, each power generation cycle can include the piston 632 (and therefore the piston 638) moving in one direction or in both directions in FIG. 6. For example, each power generation cycle can involve moving the piston 632 left to right or right to left in FIG. 6

(but not both). Alternatively, each power generation cycle can involve moving the piston 632 both left to right and right to left in FIG. 6.

Note that these represent example ways in which the refrigerant 606 can be transferred from the tank 604 to the tank 602 so that another power generation cycle can occur. Any other suitable technique can be used to transfer the refrigerant 606 from the tank 604 to the tank 602.

Although FIGS. 5 and 6 illustrate examples of power generation systems 500 and 600 that support surface air-to-water thermal power generation, various changes may be made to FIGS. 5 and 6. For example, various components in each figure can be combined, further subdivided, rearranged, or omitted or additional components can be added according to particular needs. Also, shapes, sizes, and dimensions of various components in these figures can vary as needed or desired.

Figure 7:
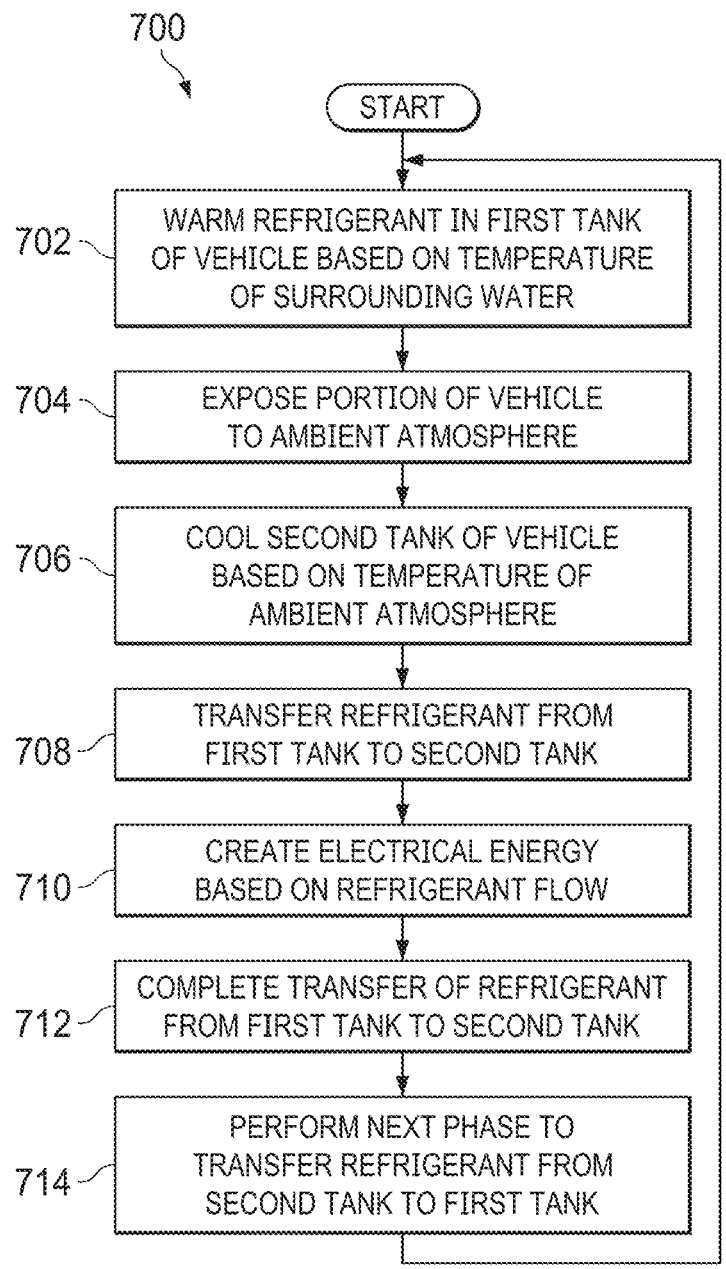
FIG. 7 illustrates an example method for power generation based on surface air-to-water thermal differences in accordance with this disclosure.

FIG. 7 illustrates an example method 700 for power generation based on surface air-to-water thermal differences in accordance with this disclosure. For ease of explanation, the method 700 is described as involving any of the underwater vehicles 100, 200, 300, 400 using either of the power generation systems 500, 600. However, the method 700 can be used with any suitable vehicle and with any suitable power generation system. Also, it is assumed in FIG. 7 that the air above water is colder than the water at the surface, but this need not be the case. It is possible that the air above water is warmer than the water at the surface, in which case the warmer and cooler temperatures in FIG. 7 can be reversed.

As shown in FIG. 7, refrigerant in a first tank of a vehicle is warmed at step 702. This can include, for example, exposing the tank 502, 602 or the heat exchanger 512, 612 to water surrounding or drawn into the underwater vehicle 100, 200, 300, 400. If the heat exchanger 512, 612 is used, this can also include the heat exchanger 512, 612 receiving thermal energy from the water and transferring the thermal energy to the tank 502, 602. This transfers thermal energy into the refrigerant 506, 606, which increases the temperature or pressure within the tank 502, 602.

A portion of the underwater vehicle is exposed to an ambient atmosphere at step 704, which cools a second tank of the vehicle at step 706. This can include, for example, the underwater vehicle 100, 200, 300, 400 breaching the surface of a body of water so that a portion of the underwater vehicle 100, 200, 300, 400 is positioned above the water's surface. This exposes the portion of the underwater vehicle 100, 200, 300, 400 to the ambient air. This can also include exposing the tank 504, 604 or the heat exchanger 514, 614 to the surrounding air. If the heat exchanger 514, 614 is used, this can further include the heat exchanger 514, 614 receiving thermal energy from the tank 504, 604 and radiating the thermal energy into the surrounding air. If the heat exchanger 514, 614 is not used, this can further include the tank 504, 604 radiating the thermal energy into the surrounding air. This removes thermal energy from the tank 504, 604, which decreases the temperature or pressure within the tank 504, 604.

The refrigerant is transferred from the first tank to the second tank at step 708, and electrical energy is created based on the refrigerant flow at step 710. This can include, for example, the refrigerant 506 flowing from the tank 502 to the tank 504 through the turbine 508, causing the generator 510 to generate electrical energy. Alternatively, this can include the refrigerant 606 flowing from the tank 602 to the tank 604 through the cylinder 632, which causes movement of the piston 638 and causes the generator 610 to generate electrical energy. Of course, the flow of refrigerant can be used to generate electrical energy in any other suitable manner. Eventually, the transfer of refrigerant from the first tank to the second tank is completed at step 712, which ends this phase of a power generation cycle. Note that some refrigerant may remain in the first tank, and the amount can vary depending on the temperatures and pressures of the tanks. However, the amount of refrigerant transferred between tanks is ideally adequate to generate enough electrical power for the vehicle.

At this point, the next phase of the power generation cycle can occur to transfer the refrigerant from the second tank back to the first tank at step 714. This can include, for example, transferring the refrigerant 506, 606 from the tank 504, 604 to the tank 502, 602 with or without generating electrical energy. As described above, various approaches can be used to transfer the refrigerant 506, 606 from the tank 504, 604 back to the tank 502, 602 (which may or may not involve additional power generation).

The amount of power generated using this approach can vary depending on the actual implementation of the power generation system. Based on laboratory analysis, specific implementations of the power generation system can achieve a 100 to 200 Watt-hour (WHr) capacity and a total system energy yield of 35 to 135 kJ per dive for low to mid latitudes or other latitudes where a 15° C. temperature differential can be obtained. For higher latitudes or other latitudes where an 8° C. temperature differential can be obtained, specific implementations of the power generation system can achieve a 25 to 50 WHr capacity. Again, however, these values are for illustration only and relate to specific implementations and temperature differences.

Depending on the operations of the underwater vehicle and therefore the power required by the vehicle, the method 700 shown in FIG. 7 can occur at any suitable interval. For example, a glider (such as the vehicle 100) can be placed into a body of water and travel a short or long distance using an initial charge on the vehicle's power storage 316. This initial travel can occur over days, weeks, or even months. During this time, the glider may or may not require a recharge of its power supply. Once at or near a desired location, the glider can begin a process of monitoring a specified area, transmitting data, and performing other operations. During these periods, the glider can perform the charging process approximately once per month, although other intervals can be used depending on a number of factors (such as current or anticipated operations).

Although FIG. 7 illustrates one example of a method 700 for power generation based on surface air-to-water thermal differences, various changes may be made to FIG. 7. For example, while FIG. 7 shows a series of steps, various steps in FIG. 7 can overlap, occur in parallel, occur in a different order, or occur any number of times. As particular examples, step 702 can occur after or concurrently with steps 704-706.

Figure 8:
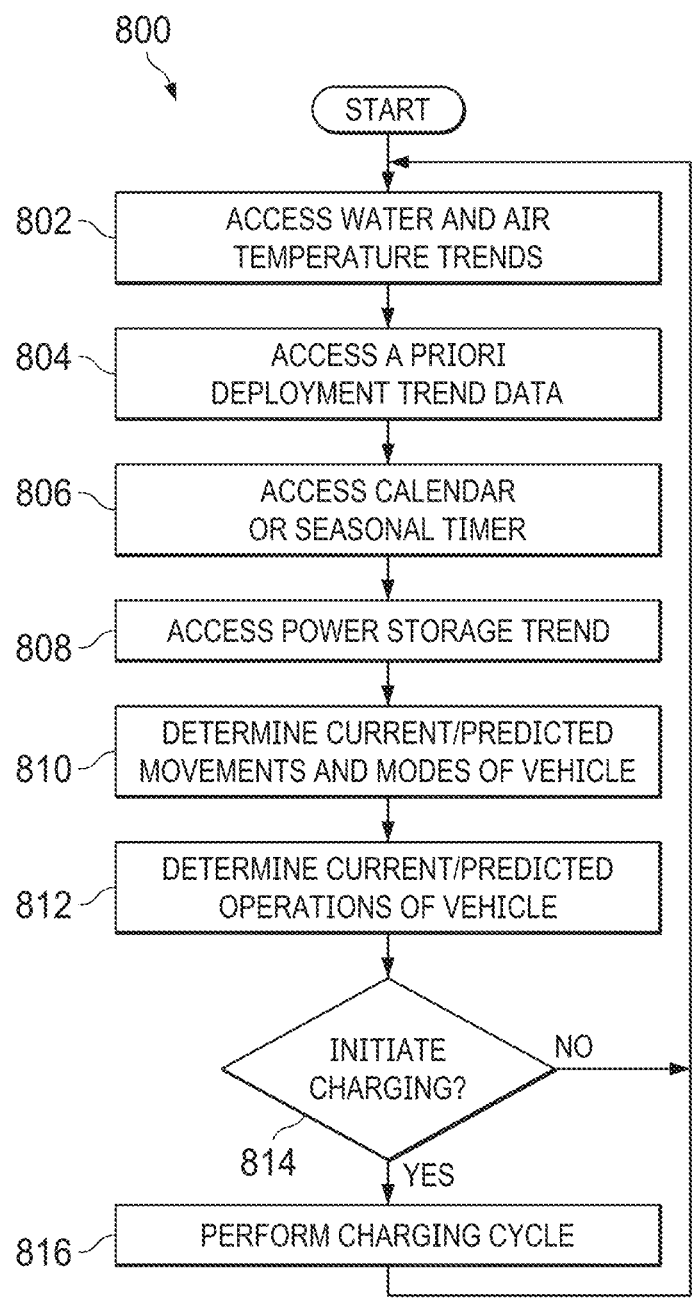
FIG. 8 illustrates an example method for controlling power charging cycles of an underwater vehicle in accordance with this disclosure.

FIG. 8 illustrates an example method 800 for controlling power charging cycles of an underwater vehicle in accordance with this disclosure. For ease of explanation, the method 800 is described as involving any of the underwater vehicles 100, 200, 300, 400 using either of the power generation systems 500, 600. However, the method 800 can be used with any suitable vehicle and with any suitable power generation system.

As shown in FIG. 8, steps 802-808 are associated with an environmental and seasonal control segment in which the underwater vehicle obtains environmental and seasonal data to be used to make predictions about when to initiate a recharge of its power supply. For example, water and air temperature trends are accessed or obtained at step 802, and a priori deployment trend data is accessed or obtained at step 804. This can include, for example, the controller 302 accessing data stored in the memory 304. The water and air temperature trends can identify changes in the air and water temperatures (possibly including both surface water and underwater temperatures) over time, and these trends can be based on sensor measurements captured by the sensor components 306 over that time. The a priori deployment trend data can include data that was stored in the memory 304 prior to deployment or use of the underwater vehicle, such as predicted weather patterns or climate patterns over a course to be traveled or a location of use. As a particular example, the a priori deployment trend data can identify potential charging opportunities based on predicted weather patterns, such as when a high-pressure system in higher latitudes is expected to drop air temperatures and provide good charging opportunities. A calendar or seasonal timer is accessed at step 806. This can include, for example, the controller 302 accessing a current date to identify expected weather patterns or climate patterns for the given time of year at a given location. In addition, a power storage trend is accessed or obtained at step 808. This can include, for example, the controller 302 accessing data stored in the memory 304. The power storage trend can identify how the amount of power stored in the power storage 316 has varied over time, which can possibly include measurements of power levels obtained during previous recharges of the power storage 316.

Steps 810-812 in FIG. 8 are associated with a mission and system control segment in which the underwater vehicle obtains data about its expected operations to be used to make predictions about when to initiate a recharge of its power supply. For example, current or predicted movements and modes of the underwater vehicle are determined at step 810. This can include, for example, the controller 302 determining whether the underwater vehicle is performing or is expected to perform gliding operations to travel over short or long distances. This can also include the controller 302 determining whether the underwater vehicle is performing or is expected to perform buoy operations in which the underwater vehicle remains at or near a specified location or within a specified area. These different modes of operation can involve different movements of the underwater vehicle and therefore different power consumptions. Also, current or predicted operations of the vehicle are determined at step 812. This can include, for example, the controller 302 determining whether the underwater vehicle is performing or is expected to perform dive operations, sensor collection, external communications, housekeeping functions, or other operations. The numbers and types of operations can require different power consumptions by the underwater vehicle.

Using this type of information, a decision can be made whether to initiate charging of the underwater vehicle at step 814. This can include, for example, the controller 302 using the various data collected or obtained to identify a setpoint or limit for the charge on the power storage 316 of the underwater vehicle. The setpoint or limit can identify the point at which the power stored on the power storage 316 falls below a desired level and recharging is needed. By using various trend data, predicted weather/climate data, and other data, the setpoint or limit can be established so that the setpoint or limit is violated at a time when recharging may occur successfully. If charging of the underwater vehicle is initiated, a charging cycle can occur at step 816. The charging cycle may be performed as shown in FIG. 7. Thus, FIG. 8 may generally represent an outer control loop that is used to control when the inner loop of FIG. 7 is performed.

As a particular example of how the method 800 of FIG. 8 can be used, assume that an underwater vehicle first operates in glider mode (such as by traveling horizontally with its wings 106 extended) and then, when a desired location is reached, operates in buoy mode (such as by operating vertically with its wings 106 stowed). The vehicle can then use a priori information on expected seasonal conditions and measured surface temperature trends to judge how long it should wait until a recharge. This can take place at periodic times by using a clock or timer to know the day/night pattern based on its current location, which may allow the vehicle to only attempt recharges at certain times (such as only at night for concealment purposes). If power generation conditions are not favorable for a prolonged period of time, a bootstrap power pack may be used to attempt some pre-determined revival strategy. Pressure sensors could be used by the vehicle to estimate its depth and help ensure that the vehicle does not breach the surface of the water unless desired (such as during charging operations).

Although FIG. 8 illustrates one example of a method 800 for controlling power charging cycles of an underwater vehicle, various changes may be made to FIG. 8. For example, while FIG. 8 shows a series of steps, various steps in FIG. 8 can overlap, occur in parallel, occur in a different order, or occur any number of times.

It should be noted that while various power generation systems and methods are described above as being used to power an underwater vehicle, the power generation systems and methods can be used in other ways. For example, the power generation systems and methods can be used to charge power carriers, such as those described in U.S. patent application Ser. No. 15/264,399 filed on Sep. 13, 2016 (which is hereby incorporated by reference in its entirety). The power carriers can then be used in any suitable manner, such as to power underwater vehicles or provide electricity to other devices or systems. With an adequate number of power generation systems (and optionally an adequate number of power carriers), a large amount of power can be made available for use.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   first and second tanks each configured to receive and store a refrigerant under pressure;
   at least one generator configured to generate electrical power based on a flow of the refrigerant between the tanks during each of multiple power generation cycles; and
   a controller configured to control operation of a vehicle that includes the tanks and the at least one generator, the controller configured to cause the vehicle to dive in order to substantially equalize an amount of the refrigerant in the tanks prior to at least some of the Power generation cycles;
   wherein the first tank is configured to be one of cooled and warmed by one of ambient air and water to a first temperature; and
   wherein the second tank is configured to be one of warmed and cooled by another of the ambient air and the water to a second temperature different than the first temperature.

2. The apparatus of claim 1, further comprising:
   a heat exchanger configured to exchange thermal energy between the first tank and the ambient air or the water.

3. The apparatus of claim 1, further comprising:
   a heat exchanger configured to exchange thermal energy between the second tank and the ambient air or the water.

4. The apparatus of claim 1, wherein the flow of the refrigerant between the tanks is based on at least one of a temperature differential and a pressure differential between the tanks.

5. The apparatus of claim 1, further comprising:
   at least one turbine configured to turn based on the flow of the refrigerant;
   wherein the at least one generator is configured to generate the electrical power based on the turning of the at least one turbine.

6. The apparatus of claim 1, further comprising:
   a first piston configured to move based on the flow of the refrigerant; and
   a second piston coupled to the first piston, the second piston configured to move hydraulic fluid;
   wherein the at least one generator is configured to generate the electrical power based on the movement of the hydraulic fluid.

7. The apparatus of claim 1, wherein the controller is further configured to control the generation of the electrical power based on at least one of:
   a temperature trend associated with the ambient air;
   a temperature trend associated with the water;
   deployment data associated with a course to be traveled or a location of use of the apparatus;
   a calendar or seasonal timer associated with a time of year; and
   a power storage trend associated with a power storage of the apparatus.

8. A system comprising:
   a vehicle comprising a body, a power generation system, and a controller;
   wherein the power generation system comprises:
      first and second tanks each configured to receive and store a refrigerant under pressure; and
      at least one generator configured to generate electrical power based on a flow of the refrigerant between the tanks during each of multiple power generation cycles;
   wherein the first tank is configured to be one of cooled and warmed by one of ambient air and water to a first temperature;
   wherein the second tank is configured to be one of warmed and cooled by another of the ambient air and the water to a second temperature different than the first temperature; and
   wherein the controller is configured to cause the vehicle to dive in order to substantially equalize an amount of the refrigerant in the tanks prior to at least some of the power generation cycles.

9. The system of claim 8, wherein:
   the first tank is configured to be cooled or warmed by the ambient air; and
   the power generation system further comprises a heat exchanger configured to exchange thermal energy between the first tank and the ambient air.

10. The system of claim 9, wherein the heat exchanger is positioned within the body such that the heat exchanger is above a surface of the water when a portion of the body breaches the surface of the water.

11. The system of claim 8, wherein:
    the first tank is configured to be cooled or warmed by the ambient air; and the first tank is positioned within the body such that the first tank is above a surface of the water when a portion of the body breaches the surface of the water.

12. The system of claim 8, wherein:
the second tank is configured to be warmed or cooled by the water; and
the power generation system further comprises a heat exchanger configured to exchange thermal energy between the second tank and the water.

13. The system of claim 12, wherein the heat exchanger is positioned within the body such that the heat exchanger is below a surface of the water when a portion of the body breaches the surface of the water.

14. The system of claim 8, wherein:
the second tank is configured to be warmed or cooled by the water; and
the second tank is positioned within the body such that the second tank is below a surface of the water when a portion of the body breaches the surface of the water.

15. The system of claim 8, wherein:
the power generation system further comprises at least one turbine configured to turn based on the flow of the refrigerant; and
the at least one generator is configured to generate the electrical power based on the turning of the at least one turbine.

16. The system of claim 8, wherein:
the power generation system further comprises:
  a first piston configured to move based on the flow of the refrigerant; and
  a second piston coupled to the first piston, the second piston configured to move hydraulic fluid; and
the at least one generator is configured to generate the electrical power based on the movement of the hydraulic fluid.

17. A method comprising:
generating electrical power based on a flow of refrigerant between first and second tanks during each of multiple power generation cycles, each of the tanks configured to receive and store the refrigerant under pressure; and
controlling operation of a vehicle that includes the tanks, wherein controlling the operation of the vehicle comprises causing the vehicle to dive in order to substantially equalize an amount of the refrigerant in the tanks prior to at least some of the power generation cycles;
wherein the first tank is one of cooled and warmed by one of ambient air and water to a first temperature; and
wherein the second tank is one of warmed and cooled by another of the ambient air and the water to a second temperature different than the first temperature.

18. The method of claim 17, wherein:
the first tank is cooled or warmed by the ambient air;
the second tank is warmed or cooled by the water; and
the method further comprises at least one of:
  exchanging thermal energy between the first tank and the ambient air using a first heat exchanger; and
  exchanging thermal energy between the second tank and the water using a second heat exchanger.

19. The method of claim 17, wherein the flow of the refrigerant between the tanks is based on at least one of a temperature differential and a pressure differential between the tanks.

20. The method of claim 17, wherein:
the first tank is cooled or warmed by the ambient air;
the second tank is warmed or cooled by the water;
the method further comprises causing a portion of the vehicle to breach a surface of the water;
the first tank is cooled or warmed based on at least one of: a presence of the first tank above the surface of the water and a presence of a first heat exchanger above the surface of the water; and
the second tank is warmed or cooled based on at least one of: a presence of the second tank below the surface of the water and a presence of a second heat exchanger below the surface of the water.

21. The method of claim 17, wherein:
ice forms on the vehicle based on the generation of the electrical power; and
the method further comprises causing the vehicle to dive under a surface of the water in order to melt the ice.

* * * * *